United States Patent
Hester et al.

[15] 3,703,347
[45] Nov. 21, 1972

[54] WASTE RECOVERY OF THERMOPLASTIC CONTINUOUS FILAMENTARY MATERIAL

[72] Inventors: Robert Hester; Howard P. Pierson, both of Kingsport, Tenn.

[73] Assignee: Eastman Kodak Company, Rochester, N.Y.

[22] Filed: Aug. 27, 1970

[21] Appl. No.: 67,324

[52] U.S. Cl. .................. 425/67, 425/113, 425/202, 425/208
[51] Int. Cl. ........................... B29d 7/02, B29f 3/02
[58] Field of Search ...... 18/4 P, 30 FR, DIG. 46, 1 B, 18/2 Y, 12 S; 425/113, 202, 208, 67, 461; 214/17

[56] References Cited

UNITED STATES PATENTS

| | | | |
|---|---|---|---|
| 3,192,293 | 6/1965 | Van Riper | 18/DIG. 46 |
| 3,344,212 | 9/1967 | Francis | 18/DIG. 46 |
| 3,517,097 | 6/1970 | Mixell et al. | 18/12 R X |
| 3,551,943 | 1/1971 | Staton et al. | 18/12 R X |
| 2,589,323 | 3/1952 | Ashby et al. | 18/12 R |
| 1,751,430 | 3/1930 | Thomson | 18/1 B UX |
| 3,119,146 | 1/1964 | Crandall et al. | 18/1 B |
| 3,233,022 | 2/1966 | Henry et al. | 18/1 B UX |
| 3,611,489 | 10/1971 | Morozov et al. | 18/12 R |

Primary Examiner—Robert L. Spicer, Jr.
Attorney—Cecil D. Quillen, Jr. and Malcolm G. Dunn

[57] ABSTRACT

Apparatus for recovering waste thermoplastic fiber of continuous length filamentary material and converting it into re-useable feed stock and particularly a large otherwise unmanageable, entangled mass of continuous length filamentary material, some or all of which being either drafted or undrafted, wherein the continuous length filamentary material is converted into random length staple fiber, the staple fiber is then mechanically compacted and melted into a melt flow, and the melt flow is finally extruded as the re-useable feed stock.

12 Claims, 10 Drawing Figures

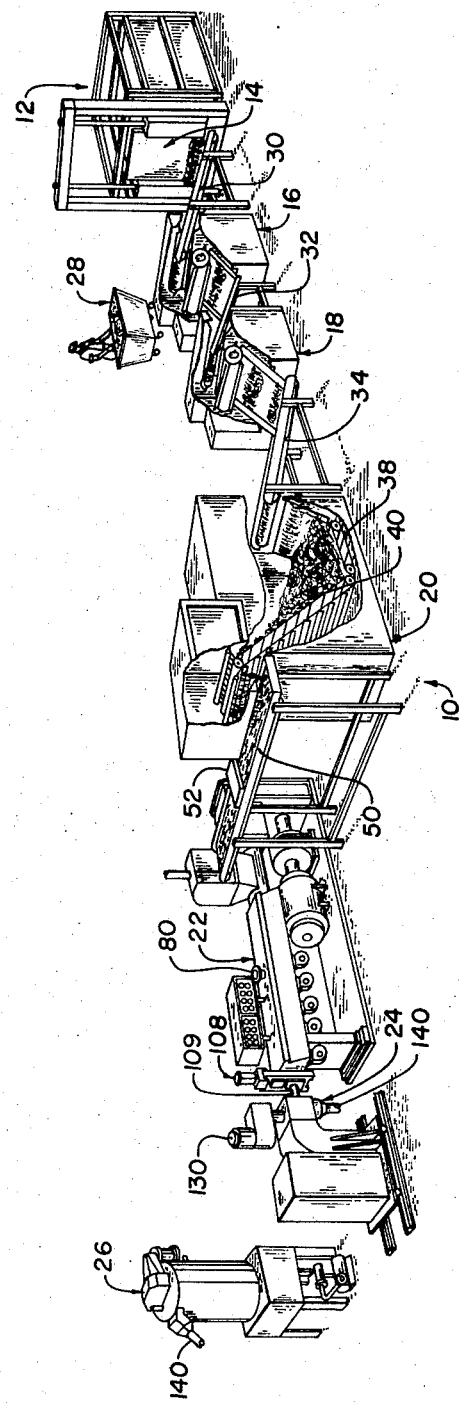
ROBERT HESTER
HOWARD P. PIERSON
INVENTORS
BY Malcolm J. Dunn
ATTORNEY

ROBERT HESTER
HOWARD P. PIERSON
INVENTORS

BY Malcolm F. Dunn

ATTORNEY

ROBERT HESTER
HOWARD P. PIERSON
INVENTORS

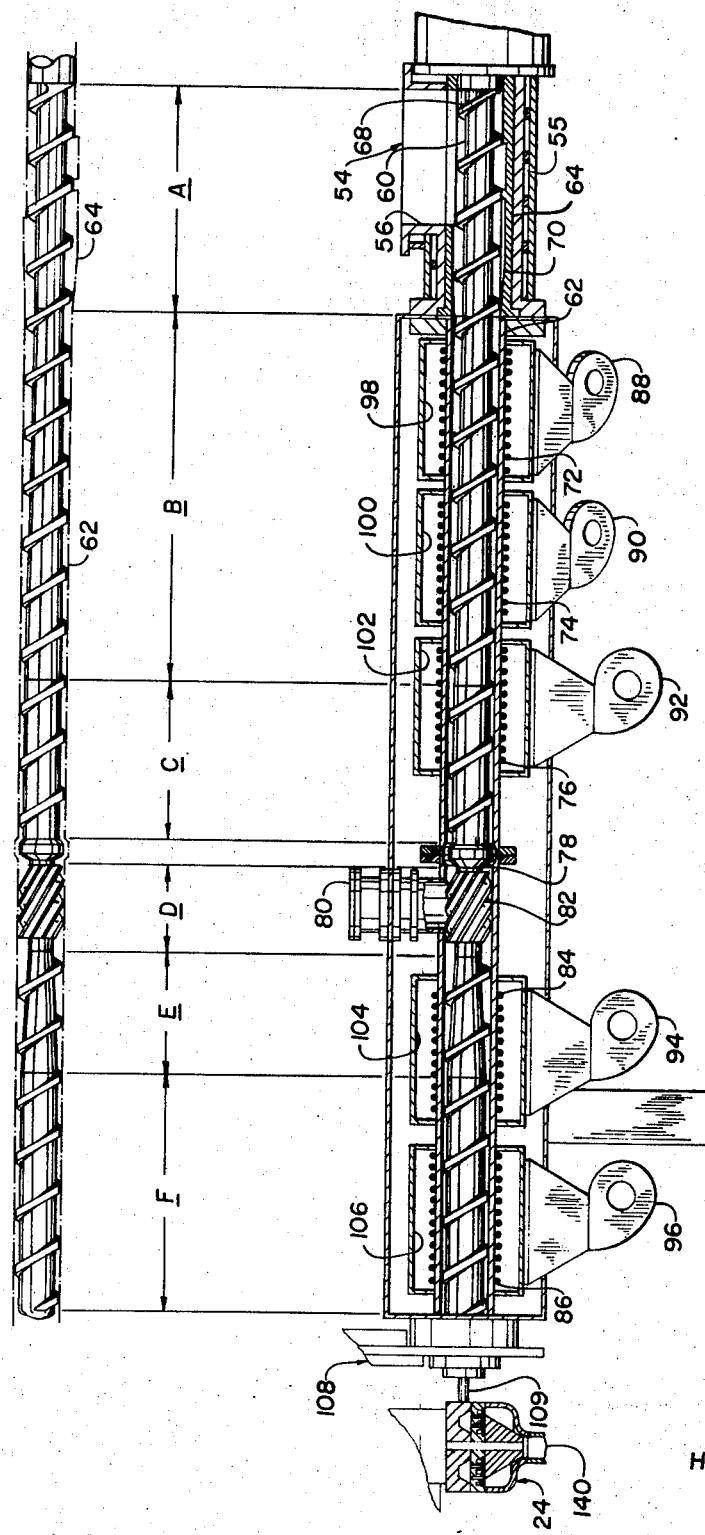

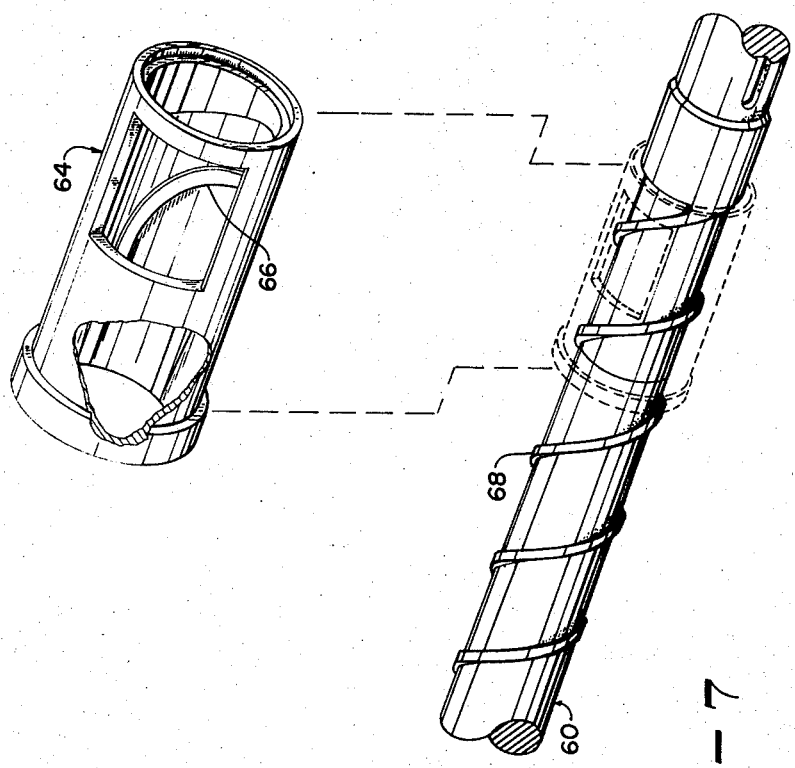

ROBERT HESTER
HOWARD P. PIERSON
INVENTORS

ATTORNEY

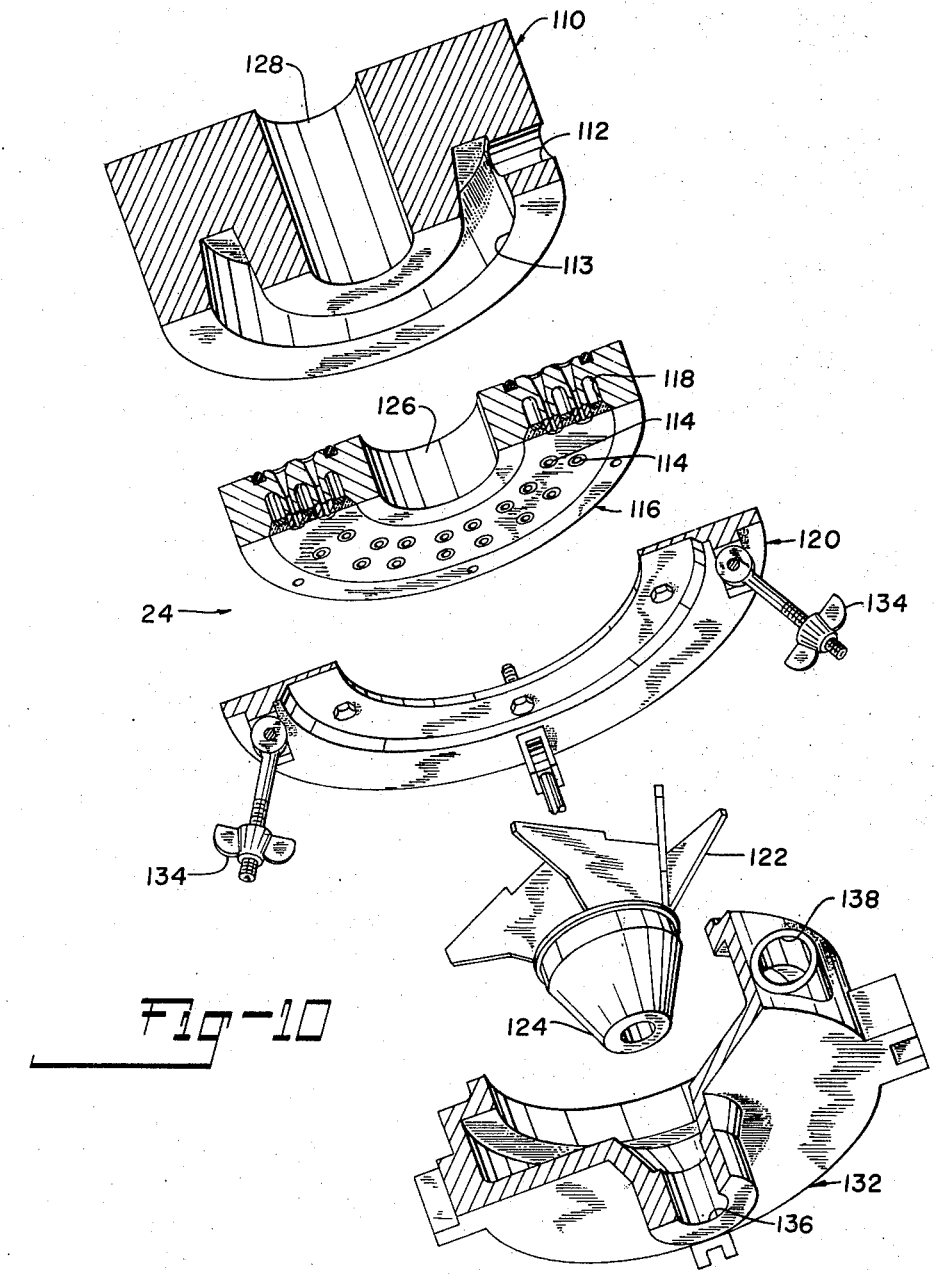

ial may be recovered and converted into re-useable feed stock without lowering the inherent viscosity (I.V.) to any substantial degree and without creating poor color in the re-useable feed stock, and to the resulting product of the process.

WASTE RECOVERY OF THERMOPLASTIC CONTINUOUS FILAMENTARY MATERIAL

BACKGROUND OF THE INVENTION

The present invention is directed to an apparatus by which waste thermoplastic fiber of continuous length filamentary material, and particularly a large otherwise unmanageable, entangled mass of continuous length filamentary material, some or all of which being either drafted or undrafted, may be recovered and converted into re-useable feed stock without lowering the inherent viscosity (I.V.) to any substantial degree and without creating poor color in the re-useable feed stock, and to the resulting product of the process.

In the spinning and processing of man-made fibers, such as fibers of thermoplastic materials, there is usually a large amount of waste created, which is due to a number of reasons. Such waste may be due to roll wraps; from starting up a processing line; or as a result of malfunctions in some of the processing equipment. The fiber waste is usually in continuous lengths, and may either be lubricated or non-lubricated, depending at which stage of the processing the waste occurred.

Attempts have been made to segregate the lubricated waste fiber from the non-lubricated, and then baling each type for subsequent disposition. Sometimes these attempts have not been successful, especially if the waste occurs over an area of a processing line including a lubrication booth with the result that part of a waste length would be non-lubricated, and the other part would be lubricated. In the latter situation it is not economical to attempt to cut one portion from the other as it is more vital that the operators on a processing line get the operating line back into operation and make certain that the fibers passing along the processing line are moving as they should.

One manner of handling the waste bales of fibers previously has been to burn them since no successful and commercially practical manner of recovering the waste material was known. The fiber and any lubricants in the fiber have created quite a pollution problem, and thus presented undesirable conditions as well as making prohibitive the cost of the facilities and personnel for handling the burning.

Another manner employed was to store the bales until some commercially effective method was developed for recovering the waste. In the meantime, however, since each bale weighs in the vicinity of about 500 pounds, storage space became a serious and costly problem, as well as being costly to move the waste bales from the processing lines to the storage area.

Still another manner involved using the waste for land fill.

Various approaches have been investigated for recovering the waste fiber in an attempt to re-use it, but these have usually been disadvantageous either due to being too expensive and thus not commercially practical, or the degradation of the material was such that the resulting product was of inferior quality and color.

One approach with respect to polyester waste such as polyethylene terephthalate (PET) waste, has been to treat fiber waste with superheated steam at a temperature below the melting point of the polyester as disclosed in U.S. Pat. No. 3,098,046. The fiber waste so treated becomes brittle and then can be reduced to a powder form. The powdered PET is next suspended in a liquid medium, such as methanol or glycol, and the resulting dimethyl terephthalate is then used again for the production of a polycondensation product.

Another approach as disclosed in Defensive Publication T870,010, published Jan. 13, 1970 in the Official Gazette of the United States Patent Office (870 O.G.393), is to pass the waste PET tow lengths through a tow dryer and to raise the temperature from a normal 140° C. to about 215° C. The result is that the waste tow becomes highly crystallized and brittle. This material is then passed through a hammermill and reduced to particles. The resulting product, however, has a low bulk density of about 15 to 20 pounds per cubic foot, whereas virgin polymer powder has a bulk density of about 50 pounds per cubic foot. One reason for the low bulk density is that there is still some fibrous-like material in the product; also the particles are not entirely reduced to powder. It is very expensive and time consuming to continue processing the material in the hammermill until it is totally reduced to powder. It is difficult to blend the resulting material of lower bulk density in with virgin polymer powder. The extruder into which the powder is fed for melt extrusion into a fiber is designed to take the higher bulk density virgin polymer powder, but the recovered lower bulk density material cannot be fed into the extruder fast enough to fill up the extruder screw flights so as to maintain a constant feed.

Additionally, a certain amount of undesirable color is introduced, and the recovered material still has a certain amount of lubricant remaining so that it is not possible to spin a first quality fiberfill which can be used for such things as matresses, pillows and air filters.

When attempt was made to recover waste polyester material of poly(1,4-cyclohexylene dimethylene terephthalate) (PCHDMT), the passing of the waste material through the tow dryer at the required elevated temperature, such as 265° C., the material was caused to become undesirably brown in color, and thus was not suitable for commercial use.

In attempts to reduce the waste materials by use of chemicals, the cost of the chemicals was too much and the process was found to be too costly to operate.

Accordingly, one of the objects of the invention is to provide an apparatus for recovering waste thermoplastic fiber of continuous length filamentary material in an economical and expeditious manner, wherein the continuous length filamentary material is converted into staple fiber, the staple fiber is mechanically compacted and melted into a melt flow, and the melt flow is finally extruded as a re-useable feed stock.

Other objects inherent in the nature of the invention will become apparent to those skilled in the art to which this invention pertains from the drawings and description that follows.

SUMMARY OF THE INVENTION

The invention, therefore, is directed to apparatus for recovering waste thermoplastic fiber of continuous length filamentary material and particularly a large otherwise unmanageable, entangled mass of continuous length filamentary material, some or all of which being either drafted or undrafted, and converting it into re-useable feed stock. The continuous filamentary material is converted into random length staple fiber or staple fiber of predetermined lengths, the staple fiber is mechanically compacted and melted into a melt flow, and the melt flow is subsequently extruded as re-useable feed stock.

BRIEF DESCRIPTION OF THE DRAWINGS

In the drawings:

FIG. 1 is a perspective view of the apparatus for recovering waste thermoplastic fiber, with portions of the structure removed to illustrate the working parts;

FIG. 6 is a view in cross section of the extruder barrel and illustrating the feed screw, the heaters, and further illustrating removed from extruder barrel the feed screw as related to the various sections of the extruder with the profile of the extruder barrel being shown in phantom lines;

FIG. 7 is an enlarged perspective view of the feed screw and the removable feed section insert, illustrating in part the wedged key section;

FIG. 10 is an exploded perspective view enlarged of portions of the underwater pelletizer.

DESCRIPTION OF THE PREFERRED EMBODIMENT

Figure 3:
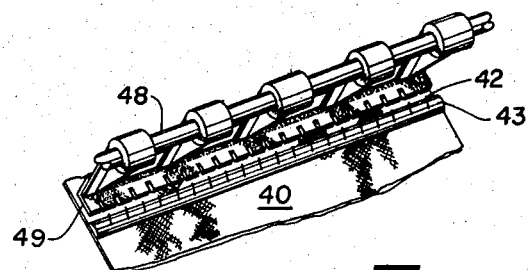
FIG. 3 is a fractional view enlarged of the doffer comb used in the storage bin.

In reference to FIG. 1 the apparatus illustrated at 10 includes a baler 12 and guillotine 14, a first rotary cutter 16, a second rotary cutter 18, a storage and hold-up bin 20, an extruder 22, an underwater pelletizer 24, and a centrifugal dryer 26 for the extruded pellets.

The waste fiber may be collected from the various processing lines in waste buggies, such as the one illustrated in FIG. 1 at 28. The buggies will each hold several hundreds of pounds of continuous filamentary waste in a large bulky, entangled mass, some or all of which being either drafted or undrafted, and lubricated or non-lubricated, which is then dumped into the baler 12, preferably through the top of the baler, and compressed into a bale of predetermined size.

The guillotine 14 when in the lowered or cutting position serves to contain the waste when it is dumped through the top of the baler, and when actuated cuts the bale into sections while a ram (not shown) within the baler moves the bale toward the guillotine in increments of about 4 to 6 inches. The severed sections (not illustrated) drop onto a conveyor belt 30 located adjacent the guillotine, and the belt conveys the severed sections to the first rotary cutter 16 wherein the sections are further cut and reduced in size, and then the output of the first rotary cutter is dropped onto another conveyor belt 32 which serves to convey the output to the second rotary cutter 18. The latter rotary cutter finally reduces and converts the waste material into staple fiber of about the same predetermined lengths or random lengths.

The staple fiber falls from the second rotary cutter onto conveyor belt 34 for subsequent conveying to the storage and hold-up bin 20.

Polyester continuous length fiber waste is extremely tenacious. The sections of the bale cut by the guillotine, even though the sections are only in 4 to 6 inch increments, may contain groups of individual lengths of fibers that are many feet long. Thus reliance upon the cut made by the guillotine is not sufficient to enable the material to be readily handled by the extruder. The single rotary cutter following the guillotine was found to be somewhat effective, but the addition of a second rotary cutter proved to make the overall process most effective in cutting and reducing the fiber to a manageable size, such as a random length staple fiber having a length of about 3 inches. This length is an approximation since some staple fiber will be less than this, and some will be perhaps as much as 6 inches in length. It has been found, however, that this approximate length of staple fiber can subsequently be fed into the extruder 22 without bridging over the opening and blocking other fiber from being fed to the extruder.

The series of cutting steps that are described above thus serve to convert the continuous length filamentary material into staple fiber.

Another manner of converting such continuous length filamentary material into staple fiber would be to use a stretch-break process, but this would require a suitable handling of the waste material so as to feed the material in continuous length form and to maintain continuity of feed.

Still another manner would be to feed the continuous length filamentary material to a fearnaught or fearnought machine that would shred and pull the waste material apart until the material is converted into staple fiber.

Figure 2:
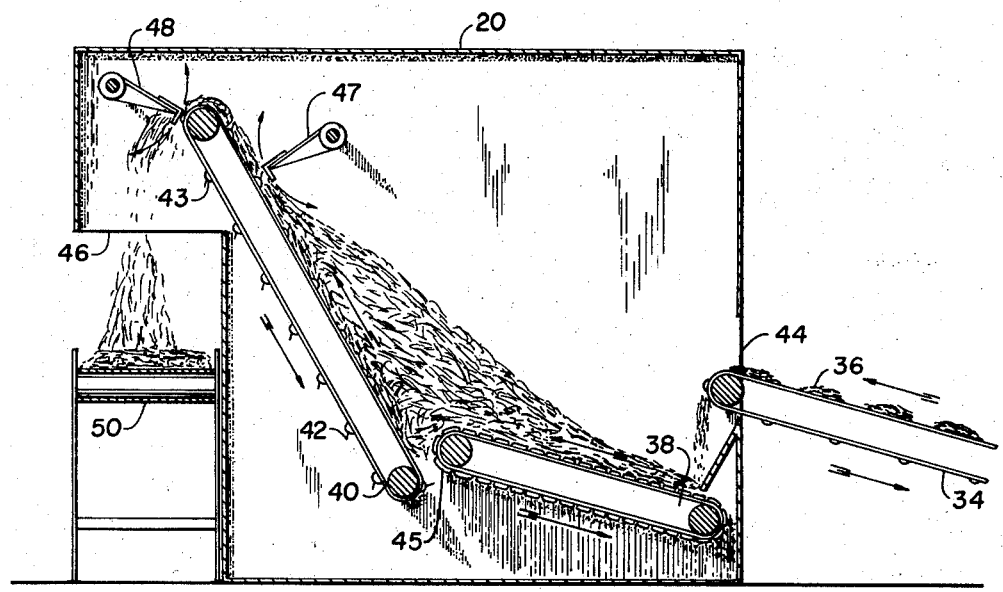
FIG. 2 is elevational view in cross section of the storage bin.

In viewing FIG. 2, the staple fiber 36 passes from the conveyor belt 34 into the storage and hold-up bin 20. The latter is provided therein with two separate apron conveyors 38, 40. Apron conveyor 40 is provided with a series of spikes, as shown for instance at 42, and which project from wooden slats 43. The two apron conveyors convey the collected staple fiber from the inlet opening 44 of the storage bin to the outlet opening 46 in a controlled manner, as will be described hereinafter.

The storage bin that has proved to be most effective is what is known in the trade as a Hunter blender, or any equivalent make, manufactured by the Hunter Machinery Company. This blender was modified by removing about two-thirds of the spikes and the slats from which these spikes projected so that the spacing between adjacent spiked slats is about 5 inches. This was done in order to prevent the staple fibers from becoming interlocked with the spikes on adjacent slats, and thus minimize the tendency of the fiber to cling to the apron conveyor. The blender was further modified by slowing the speed of the two apron conveyors 38, 40 so as to avoid overfeeding of the staple fiber. Such overfeeding would otherwise result in tumbling back of the fiber and thereby cause undesirable roping and knotting of the staple fiber.

The first apron conveyor 38 is also provided with a plurality of slats 45 which are not spiked. This conveyor serves to maintain continuity of feed of the staple fiber to the second apron conveyor 40.

Maintaining continuity and control of the feed to the extruder is essential to effective operation of the overall process. One manner of controlling the feed is to regulate the speed of the two apron conveyors 38, 40 in the storage bin by the operator who makes the necessary speed adjustments when he observes that there is either too much or too little staple fiber being fed into the extruder. Another manner of regulating the speed of the two apron conveyors is in response to an ammeter (not shown) connected to the extruder and which indicates whether the load on the extruder feed screw is too much or too little.

A comb doffer 48 is located adjacent the top of apron conveyor 40 and the outlet opening 46 of the storage bin. The comb doffer brushes the staple fiber from the apron conveyor 40 onto a conveyor belt 50, as illustrated in FIG. 2. As indicated by the arrows in FIG. 2, the comb doffer oscillates between two positions relative to the top of the apron conveyor 40. As may be seen in FIG. 3, the comb doffer is provided with a slotted member 49 which clears the spikes 42 and lifts any staple fibers adhering thereto.

An additional comb doffer 47 may be optionally provided adjacent apron conveyor 40, and which may be caused to oscillate, as shown by the arrows in FIG. 2, to preclude the possibility of too much staple fiber from moving up to the outlet opening 46.

The storage bin is thus capable of receiving more staple fiber than is metered out to the extruder; serves to receive and to store the staple fiber; and serves to control and to regulate the feed or metering of the staple fiber through the outlet opening to the extruder and thereby assures and maintains continuity of feed to the extruder.

Figure 4:
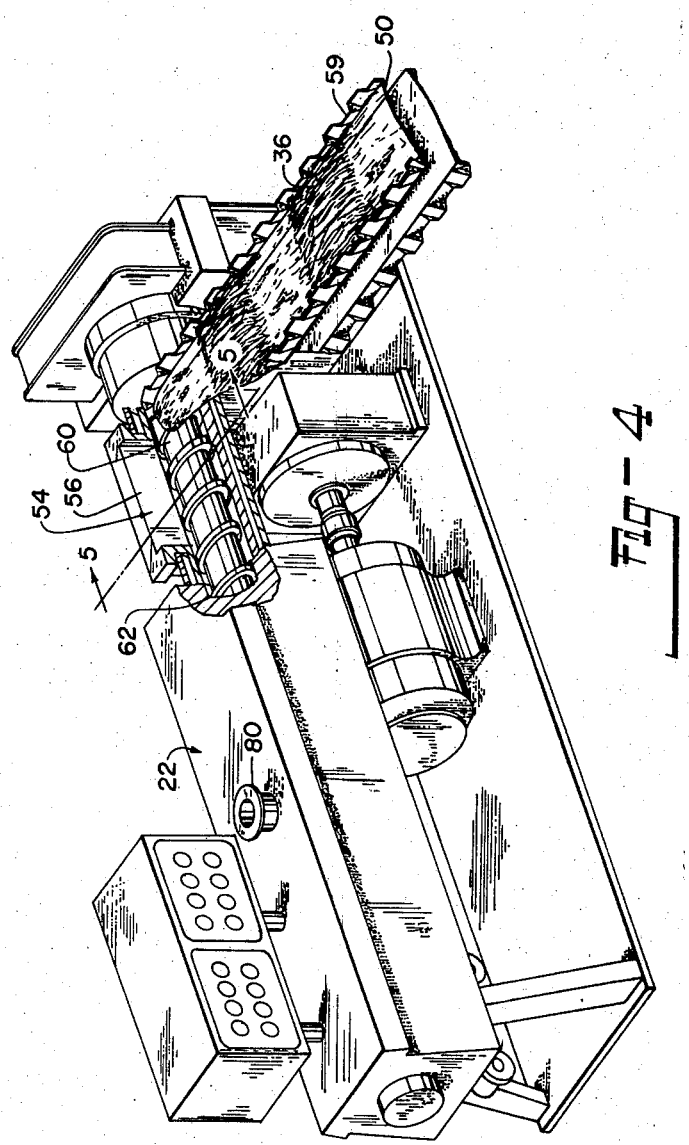
FIG. 4 is a perspective view of the extruder with portions broken away and illustrating the feed section and a portion of the feed screw.

The conveyor belt 50 carries the staple fiber to the extruder 22, and passes under a metals detector unit 52 (FIG. 1), which operates in a well-known manner to detect any metal, which may inadvertently have been collected with the waste fiber, and to cause the conveyor belt to stop moving upon such detection. The metals detector unit thus prevents any metals from entering via the storage bin and damaging the extruder. Conveyor belt 50 is provided with flexible corrugated sidewalls or "troughs" 59 (FIGS. 4, 5), such as made by the Bucket Elevator Company that prevent the fiber from falling from the belt. Polyester fiber, for instance, can readily slip or spill from a moving conveyor unless some means is provided to contain it on the conveyor.

Figure 5:
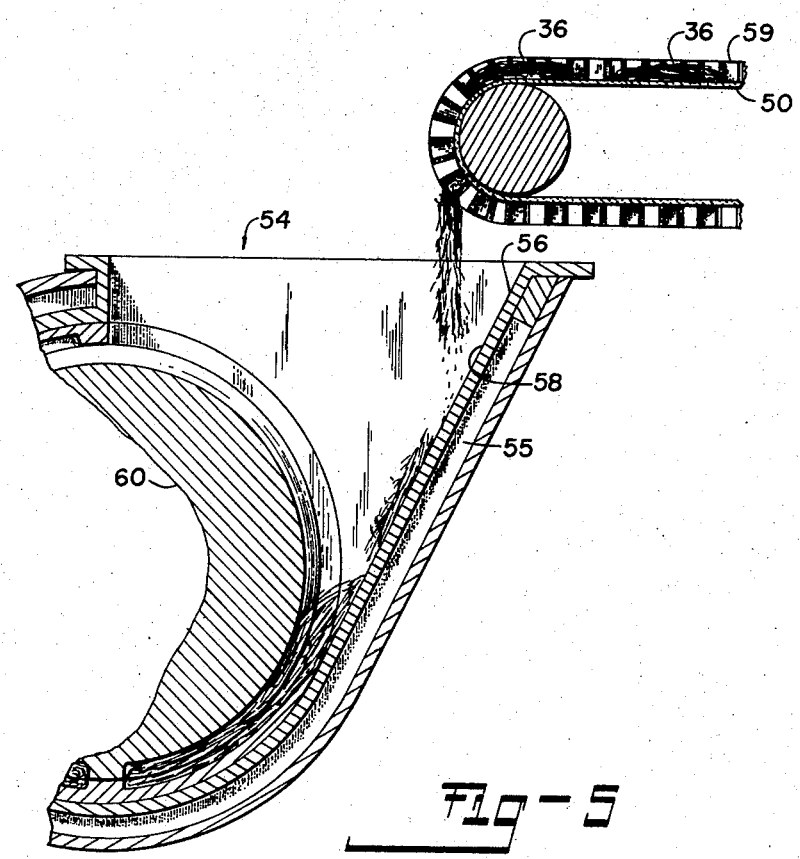
FIG. 5 is a fractional view in cross section taken along line 5—5 in FIG. 4 and illustrating the fiber being fed into the feed section.

The staple fiber is delivered from conveyor 50 into the watercooled jacketed feed section 54 of the extruder 22 through an elongated tangential side opening 56 whereupon the fiber drops onto a downwardly inclined surface 58. The latter surface enables the staple fiber to be fed directly toward the bite of the feed screw 60; the "bite" defined as being between the downwardly turning portion of the feed screw and the interior wall or downwardly inclined surface 58 of the extruder barrel 62 (FIG. 5). The feed section is jacketed (FIGS. 5, 6) so as to circulate water within the jacket in the area designated 55. The water serves to cool the interior wall surfaces of the feed section and especially the downwardly inclined surface 58. During the operation of the extruder, heat from the portion of the extruder that is forward of the feed section will be conducted back to the feed section through the feed screw 60. The heat emanating from the feed screw will tend to heat the interior wall surfaces of the feed section. It is therefore necessary to cool the interior wall surface and particularly the downwardly inclined surface 58 so as to prevent the staple fiber from sticking to the downwardly inclined surface. If the staple fiber sticks to the latter mentioned surface, other incoming staple fiber will merely collect on top of the stuck fiber and will quickly bridge over the opening to the feed section, thereby preventing further feed of staple fiber to the bite of the feed screw.

The tangential side opening, the downwardly inclined surface and the jacketed feed section are essential for the success and effectiveness of the invention. Previously, it has not been possible to feed staple fiber into an extruder. The fiber would bounce along on top of the feed screw, and other fiber fed on top of the first fed fiber would merely pile on top and bridge across the opening and thereby prevent additional fiber from being fed into the extruder.

Also essential for the effectiveness of the invention is that the elongated tangential side opening 56 should be about two times as long as the diameter of the feed screw as a minimum, and preferably about three times the diameter. Thus, if the feed screw should be 6 inches in diameter, the side opening would be about 18 inches long.

Figure 9:
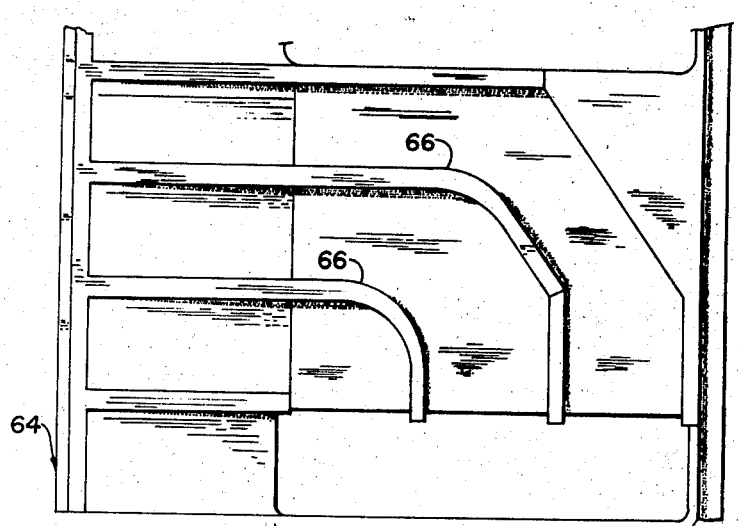
FIG. 9 is a development of the feed section insert to illustrate the arrangement of the wedged keys.
Figure 8:
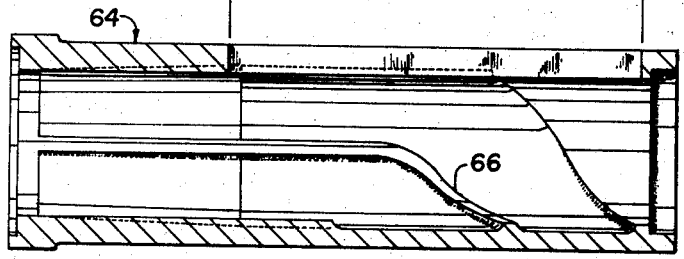
FIG. 8 is an enlarged cross-sectional view of the feed section insert.

Another difficulty previously encountered in feeding staple fiber into an extruder is that once the feed screw had accepted the fiber, the fiber would not move forward along the length of the extruder barrel. Instead, the fiber would collect as a wad of material around the shaft of the feed screw and would stay in about the same place rotating with the feed screw. This difficulty was solved by providing in the feed section of the extruder a keyed section or insert 64 having keyed wedges 66. The keyed wedges extend radially inwardly from the interior wall surface of the keyed section or insert 64, and are circumferentially spaced apart and are also spaced from the feed screw 60. As may be best seen in FIGS. 8 and 9, the keyed wedges initially spiral around and along a portion of the length of the feed section, and then straighten so as to extend parallel to and for the remainder of the feed section.

The keyed wedges in the feed section cooperate with the feed screw to assure forward feeding of the staple fiber and to prevent the fiber from remaining in one location in a wadlike form around the feed screw and thereby rotate with the feed screw. The keyed wedges serve to provide resistance to the turning of the staple fiber, and thus the flights 68 of the feed screw can then move the staple fiber forward.

The initial spiraling of the keyed wedges prevents the staple fiber from being sheared with the possible result of filling up solid the spaces between adjacent keyed wedges and therefore being beyond the reach of the feed screw flights, which could otherwise push the material forward.

The keyed wedges, their particular disposition and arrangement, and in cooperation with the flights of the feed screw, thus serve to maintain movement of the mass of the staple fiber perpendicular to the feed screw flights rather than at an inclined angle which would otherwise tend to promote the undesirable shearing mentioned above. When the mass of the staple fibers is essentially perpendicular to the feed screw flights, the latter can then effectively move the staple fibers forward. Once the staple fibers have been given their initial impetus, the mass of staple fiber coming from behind serves to keep the mass that is forward thereof moving. Thus the shear that may occur forward of the initial spiralling of the keyed wedges will be of no consequence since the mass of staple fibers coming from behind will assure movement of all of the material that is forward thereof. An advantage of this arrangement is that no material will be left undesirably too long in one place and otherwise become degradated due to undesirable over-exposure to heat. Such over-exposure would not only affect the I.V. but also the color of the ultimate product.

Although the keyed section is shown as being a separate unit or insert 64 that may be fitted within the extruder in the feed section 54, the keyed wedges may also be formed integral with the extruder. Certain advantages, however, accrue by having an insert. For instance, if for some reason any metal should fall into the opening of the extruder, it would be easier to repair damage to the insert by replacing it rather than replacing the entire feed section. Damage to the feed screw and its flights would be repaired in conventional manner. Another reason: If the characteristics of the staple fiber should differ from one type to another, a change of the insert for one having keyed wedges of a different size or width, or even disposition of the wedges, could readily be made.

When the staple fibers are moved by the feed screw forward of the tangential side opening 56 and into the enclosed portion of the feed section, mechanical compaction of the fibers commences. The root diameter of the feed screw is of constant size in the area of the feed section, such area or first section being designated at A in FIG. 6 of the drawings. The interior wall surface of the feed section tapers inwardly toward the feed screw at a location adjacent the tangential side opening, as shown at 70 in FIG. 6. The taper reduces the volume between the feed screw and the extruder barrel and thereby aids mechanical compaction. The flights on the feed screw, combined with the taper of the feed section, have a compaction ratio of about 5:1, which will thus serve to assure exclusion of essentially all of the air.

In the second area or second section, designated B in FIG. 6, heat is applied from the extruder barrel by means such as the electric heaters 72, 74 and 76. The root diameter of the feed screw tapers radially outwardly thereby further reducing the volume between the feed screw and the extruder barrel and thus increasing mechanical compaction. It is in this area that it is thought that conversion into a melt flow commences and without the presence of air. Also, it is thought that most of the volatiles and moisture in the form of vapor are removed through the opening in the feed section by virtue of the drying action occurring in the initial stages of the compaction. The compacted staple fiber or compacted material is moved by the feed screw relative to the hot barrel interior surface, the latter surface serving to melt that portion of the compacted material that is in contact with the surface and thereby forming a molten fluid film. The fluid film along with the hot interior wall surface generates further melting of the compacted material due to viscous heat generation in the molten fluid film above the compacted material. This commences a phase transition area or melting area in which the solid polymer or the compacted material and the molten fluid film coexist.

The heat generated by electric heater 72 is in the temperature range of about 490° to 540° F. for a staple fiber such as from PET; and in the range of about 530° to 550° F. for a staple fiber such as from PCHDMT.

Electric heater 74 generates heat in the temperature range of about 520° to 550° F. for PET fibers; and in the range of about 580° to 600° F. for PCHDMT fibers.

Electric heater 76 generates heat in the temperature range of about 405° to 520° F. for PET fibers; and in the range of about 530° to 550° F. for PCHDMT fibers.

In the third area or section, designated C in FIG. 6, the root diameter of the feed screw and the inside diameter of the interior wall surface remains constant. The phase transition is still in progress, and pressure is being increased in the melt flow.

A ring valve 78 is provided at the end of the third section C and serves to prevent solid material from passing therebeyond in gross amounts, and it also enables operation of the first stage metering zone, as including sections A, B and C, at higher pressures. The ring valve further serves to cooperate to prevent flooding the vent 80.

The ring valve is adjustable in a conventional manner so as to regulate the spacing between the ring valve and the barrel interior wall surface. Such adjustment serves to regulate the back pressure in the first stage metering zone, and to determine the rate of flow of the melt flow past the ring valve. It also assures that essentially no unmelted particles will pass thereby. For a further description of a ring valve, reference may be made to Heston U.S. Pat. No. 3,475,787.

In the fourth area or section, designated D in FIG. 6, any remaining volatiles are vented through vent 80. The flights 82 are so arranged to enable exposure of more polymer surface area for more efficient disengaging of gaseous products. The flights are only partially filled with the melt flow so as to enable the disengaged gas to reach the vent opening. This section may operate at about zero gage pressure or atmospheric pressure. If desired, the section also may be operated under a vacuum.

The fifth area or section, designated E, and the sixth area or section, designated F, in FIG. 6, together constitute the second stage. As may be seen in FIG. 6, the root diameter of the feed screw in the fifth section E tapers radially outwardly, but is reduced in overall diameter from that of the preceding section in order to prevent flooding of the preceding vent section. Probably, more disengaging of the gaseous products occurs in the fifth section. Also, pressure is being built up in the sixth section and possibly the fifth section sufficient to pump the melt flow or molten polymer through the die of the underwater pelletizer 24.

The electric heater 84 in the fifth section generates heat in the temperature range of about 400° to 520° F. for PET fibers; and in the range of about 530° to 550° F. for PCHDMT fibers.

The electric heater 86 in the sixth section generates heat in the temperature range of about 390° to 520° F. for PET fibers; and in the range of about 530° to 550° F. for PCHDMT fibers.

The temperature in each of the electric heater sections is regulated by fans designated at 88, 90, 92, 94 and 96 which force cooling air around the outside of the extruder barrel through the jacketed areas designated at 98, 100, 102, 104 and 106. This control is essential to prevent a build-up of heat as the compacted material continues to melt and thereby minimizes possible degradation of the melt flow.

The molten polymer or melt flow passes through a screen and screen adapter, which are not specifically illustrated other than at the portion designated at 108 in FIGS. 1 and 6. Block induction heaters (not shown) are provided for the screen and screen adapter as well as the spare screen and screen adapter (not shown) so as to maintain temperatures within certain ranges. The screen will be maintained in the range of about 390° to 520° F. for PET fibers; and in the range of about 530° to 550° F. for PCHDMT fibers. The screen adapter will be maintained in the range of about 400° to 520° F. for PET fibers; and in the range of about 530° to 550° F. for PCHDMT fibers.

The molten polymer or melt flow is pumped from the extruder 22 to the underwater pelletizer 24 through a connecting pipe or adapter section 109 (FIGS. 1 and 6) that is suitably heated by a band heater (not shown), the underwater pelletizer being shown in more detail in FIG. 10.

In reference to FIG. 10, therefore, the melt flow enters the pelletizer body 110 through inlet 112 and around annular channel 113 for extrusion through the orifices 114 of die plate 116. A hot high temperature heat transfer liquid or fluid such as Monsanto's THERMINOL 77 fluid is circulated through channels 118 located on one side of the die plate so as to heat the die plate and promote flow of the polymer through the die plate. The die plate is retained in position against the pelletizer body 110 by a retainer or support plate 120. A rotatable knife 122 and hub 124 are supported for rotation by a shaft (not shown) which extends through opening 126 in the die plate and opening 128 in the pelletizer body and which is suitably connected for driven rotation to a motor 130 (FIG. 1) located above the pelletizer. A water housing 132 is provided within which heated water is circulated against the other side of the die plate. The housing is held in position against the retainer plate 120 by bolts and wing nuts shown at 134. The circulating hot water enters the water housing through inlet 136 and into contact against the face of the die plate. The water and pellets, as formed by the revolving knife when the molten polymer is extruded through the orifices and sheared by the knife, exit as a slurry through exit opening 138. The slurry then flows to the centrifugal dryer 26 through a pipe 140 (fragmentarily shown in FIG. 1). U.S. Pat. No. 3,477,098 describes one type of centrifugal air dryer used in connection with an underwater pelletizer, and reference may be had to this patent for a better understanding of centrifugal dryers. The pellets then may pass to a storage silo (not shown) after the water is removed and maintained under a suitable inert gas.

The temperature of the heat transfer fluid is in the range of about 570° to 770° F. for PET polymer; and in the range of about 580° to 800° F. for PCHDMT polymer.

The temperature of the hot circulating water is in the range of about 80° to 200° F. for PET polymer; and in the range of about 100° to 210° F. for PCHDMT polymer.

The resulting I.V. (Inherent Viscosity) of the finished pellets or re-useable feed stock is about 0.45 to 0.55 for PET; and is about 0.45 to 0.68 for PCHDMT. This compares approximately to an I.V. of about $0.60 \pm 0.02$ for virgin PET pellets, and to an I.V. of about $0.785 \pm 0.02$ for virgin PCHDMT pellets.

The following table lists a comparison of properties that the re-useable feed stock has in comparison to virgin feed stock from which the re-useable feed stock is subsequently derived.

TABLE

| | Virgin Feedstock | | Re-useable Feedstock | |
|---|---|---|---|---|
| | PET | PCHDMT | PET | PCHDMT |
| inherent viscosity | $.60\pm.02$ | $.785\pm.02$ | .45 to .55 | .45 to .68 |
| color $R_d$ | | | $80\pm5$ | $77.5\pm4$ |
| *SD | $87\pm3$ | ***$83+4-2$ | | |
| **B | $87\pm3$ | **$84+3$ | | |
| | | | $+1.8\pm1$ | $-.5\pm1$ |
| "a" | | | | |
| *SD | $+1\pm1$ | ***$-1\pm1$ | | |
| **B | $-.5\pm1$ | **$-1\pm1$ | | |
| | | | $+.5\pm1$ | $+5\pm2$ |
| "b" | | | | |
| *SD | $-3.5\pm1.5$ | ***$+4\pm1.5$ | | |
| **B | $+5.5\pm1-2$ | **$+4\pm1.5$ | | |
| melting point (DSC)**** | $252°C\pm3°$ | $291°C\pm4°$ | $255°C\pm5°$ | $290°C\pm6°$ |

*Semi-dull ($0.20\% \pm .02\%$ $TiO_2$)
**Bright (No $TiO_2$)
***Semi-dull ($0.32 \pm .02\%$ $TiO_2$)
****Differential Scanning Calorimeter The "color $R_d$," "a" and "b" are light reflectance readings made on a Gardner Automatic Color Difference Meter, the latter being manufactured by Gardner Laboratory, Inc. "$R_d$" is defined as one hundred times the amount of light reflected by a sample divided by the amount of light reflected by a perfectly diffusing sample (actually by magnesium oxide), when the light is incident upon the sample at an angle of 45° and the measuring device records the light diffused perpendicularly from the same or at 0°. A completely absorbing specimen or sample would have a $R_d$ value of 0, and a perfect diffusing white would have a value of 100. Thus the higher the value, the whiter the sample.

The "a" and "b" values are chromaticity coordinates. A plus (+) "a" equals redness; a minus (−) "a" equals greenness; a plus (+) "b" equals yellowness; and a minus (−) "b" equals blueness. More greenness and more blueness is preferred with respect to the two particular polyesters mentioned herein.

No distinction is made in the table between semi-dull and bright polyester in the re-useable feed stock since no attempt was made to segregate the two types of waste continuous filamentary material; thus the readings for re-useable feed stock may or may not be a composite of semi-dull and bright polyester, depending upon the runs that were made and the extent of waste generated at the time of the runs.

The percentages of $TiO_2$ are only representative of one type of semi-dull polyester, and the color reflectance readings would differ with the use of other percentages of $TiO_2$.

An advantage of the above-described system of waste recovery is that it is no longer necessary to segregate lubricated waste filamentary material from non-lubricated material, nor is it necessary to remove the yarn lubricant from the waste material before passing the material into the system for recovery of the re-useable feed stock. Vaporized water and oil may escape through the opening in the feed section and through the vent 80.

Another and still more significant advantage is that bulky, otherwise unmanageable mass of continuous length filamentary materials may be readily handled, and even though such material may be in the drafted or undrafted state or be a combination of either state, and even though the material may be either in a lubricated or non-lubricated condition or be a combination of either condition.

Furthermore, the waste continuous length material may be readily processed by the arrangement disclosed herein without the necessity of pre-treating the material in any manner, such as by pre-drying to eliminate moisture because drying is accomplished in the feed section and in the initial stages of compaction and the resulting vapors are essentially removed through the opening in the feed section.

Although a system could be used in which the molten polymer would extrude through a die as a series of strands at the end of the extruder and into a water bath to be subsequently cut into pellets, the underwater pelletizer is preferred because of the advantages it offers. For instance, the resulting product is more uniform and attractive, and does not have to be classified. Another advantage is that there is less exposure of the finished product to atmospheric contaminants, if any contaminants were to be present. Still another advantage is that there is no exposure of molten polymer to the atmosphere, and thus there is a potential color improvement in the final product. A further advantage is that there are less fines or dust particles due to the absence of sharp corners on the pellets. A still further advantage over the extrusion stand arrangement is that the latter is difficult to set up if the feed of the staple fiber into the extruder should be lost for any reason.

The invention has been described in detail with particular reference to preferred embodiments thereof, but it will be understood that variations and modifications can be effected within the spirit and scope of the invention.

We claim:

1. Apparatus for recovering waste thermoplastic fiber of continuous length filamentary material and converting it into re-useable feedstock, and comprising:

means for converting said continuous length filamentary material into staple fiber;

storage means for receiving and storing said staple fiber;

conveyor means for moving said staple fiber to said storage means from said means for converting said continuous length filamentary material;

said storage means having an inlet through which the staple fiber is received and an outlet through which the staple fiber leaves the storage means, a conveyor means within the storage means for moving the staple fiber from the inlet to the outlet;

an extruder for compacting and melting said staple fiber;

conveyor means for delivering said staple fiber to said extruder from said storage means;

said extruder having at one end a feed section adapted to receive said staple fiber and a feed screw that extends the length of the extruder and feed section;

said feed section defining an elongated tangential side opening through which said staple fiber is introduced, and having a downwardly inclined surface that extends from said tangential side opening and to a location tangentially adjacent said feed screw and adapted to conduct said staple fiber into the bite of the feed screw as defined therebetween by the downwardly turning portion of the feed screw and said downwardly inclined surface;

said feed section further being jacketed and thereby adapted to be cooled by a circulating fluid medium so that the feed section interior wall surface with which the staple fiber comes into contact is below the temperature at which the staple fiber would tend to stick to said interior wall surface;

said feed section still further having a plurality of keyed wedges extending radially inwardly from the interior wall surface of the feed section and circumferentially spaced apart and spaced from said feed screw, said keyed wedges initially spiralling partly around and along a portion of the length of the feed section and then straightening out to extend parallel to and for the remainder of said length of the feed section, the keyed wedges adapted to cooperate with said feed screw to prevent said staple fiber from rotating with said feed screw and to assure continuous forward feeding of the staple fiber from the tangential side opening;

said extruder having heating means extending along the length of the extruder forward of the feed section for melting said staple fiber into a melt flow and means for forcing cooling air around the outside of the extruder so as to regulate the heat applied to the staple fiber;

extrusion die means comprising an underwater pelletizer defining an inlet for receiving said melt flow, a die through which the melt flow is extruded, means for circulating a heated fluid through said die to maintain a predetermined temperature, means for circulating a cooling fluid on the extrusion side of the die to cool the melt flow when extruded through the die, shearing means for shearing melt flow into pellets when the melt flow is extruded through the die, and outlet means adapted to conduct therethrough the extruded pellets and cooling liquid as a liquid slurry;

means connecting the extruder and the extrusion die means and adapted to conduct said melt flow from one to the other; and means following the underwater pelletizer and adapted to receive said liquid slurry from said outlet means and remove the liquid from and dry said pellets.

2. Apparatus for recovering an entangled mass of waste thermoplastic fiber of continuous length filamentary material and converting it into re-usable feed stock, and comprising:

means for compressing said entangled mass of continuous length filamentary material into a mass of predetermined size;

means for cutting said mass of predetermined size into sections of predetermined size, and further means for cutting said sections into staple fiber;

extruder means for mechanically compacting and melting said staple fiber into a melt flow, and extruding said melt flow into said re-useable feedstock;

said extruder means having a barrel and a feed screw rotatable within said barrel, said barrel having connected at one end an extrusion die means and at the other end including a feed section, and being provided with heating means along its length;

said feed section defining an elongated tangential side opening through which said staple fiber is introduced into the bite of the feed screw, as defined therebetween by the downwardly turning portion of the feed screw and the interior wall of the barrel; and means for feeding said staple fiber to and into said tangential side opening and into the bite of the feed screw thereby entrapping the staple fiber on the underside of the feed screw and including means for controlling and metering the feed of said staple fiber;

said feed section further including therewithin means for preventing said staple fiber from rotating with said feed screw and thereby adapted to enable and assure continuous forward movement of the staple fiber from the feed section to said extrusion die means.

3. Apparatus according to claim 2, and wherein the extruder means further comprises:

means for internally cooling said feed section of the barrel so that the feed section interior wall surface with which the staple fiber comes into contact is below the temperature at which the staple fiber would tend to stick to said feed section interior wall surface.

4. Apparatus according to claim 2 and wherein said extrusion die means comprises an underwater pelletizer including a die, means located on one side of the die to heat the die, and means on the other side of the die to circulate heated water against the face of the die.

5. Apparatus according to claim 2 and wherein said means for controlling and metering the feed of said staple fiber includes a storage bin adapted to receive and store more staple fiber than can be fed directly to said extruder means for mechanically compacting and melting said staple fiber, said storage bin having inlet and outlet openings through which the staple fiber moves, and including therewithin conveyor means for moving the stored fiber from the inlet opening to the outlet opening and means for controlling the amount of staple fiber that moves through said outlet means.

6. Apparatus according to claim 2 and wherein said means for preventing said staple fiber from rotating includes surfaces extending radially inwardly from the interior wall of the feed section and being circumferentially spaced apart and adapted to cooperate with the flights on said feed screw to keep the movement of the mass of staple fibers perpendicular to the screw flights.

7. Apparatus according to claim 2 and wherein said means for preventing said staple fiber from rotating includes a keyed section extending radially inwardly from the interior wall surface of the barrel and spaced from said feed screw, said keyed section initially spiralling partly around and along a portion of the length of the feed section and then straightening out to extend parallel to and for the remainder of said length of the feed section.

8. Apparatus according to claim 2 and wherein said means for preventing said staple fiber from rotating includes a plurality of keyed wedges extending radially inwardly from the interior wall surface of said feed section and circumferentially spaced apart and spaced from said feed screw, said keyed wedges each initially spiralling partly around and along a portion of the length of the feed section and then straightening out to extend parallel to and for the remainder of said length of the feed section.

9. Apparatus according to claim 7 and wherein said feed screw has substantially coextensive with said tangential side opening a first section having a root diameter of constant size, the interior wall surface adjacent to said first section and to said side opening tapering inwardly toward said feed screw and thereby adapted in cooperation with said feed screw to initiate compression of said staple fiber.

10. Apparatus according to claim 7 and wherein a downwardly inclined surface extends from said elongated tangential side opening toward said bite of the feed screw, said inclined surface adapted to conduct said staple fiber into said bite when the fiber is introduced into said side opening.

11. Apparatus according to claim 2 and wherein said tangential side opening has a length about three times the diameter of the feed screw.

12. Apparatus according to claim 2, and wherein a downwardly inclined surface extends from said tangential side opening toward said bite of the feed screw, said inclined surface adapted to conduct said staple fiber into said bit when the fiber is introduced into said side opening.

* * * * *